US010538425B2

(12) United States Patent
Reiter et al.

(10) Patent No.: US 10,538,425 B2
(45) Date of Patent: Jan. 21, 2020

(54) ANTI-FRACTURE EXPANSION DEVICE

(71) Applicant: Wayne Fueling Systems LLC, Austin, TX (US)

(72) Inventors: Jeffrey Reiter, Austin, TX (US); Artemus A. Shelton, Hutto, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 224 days.

(21) Appl. No.: 15/334,521

(22) Filed: Oct. 26, 2016

(65) Prior Publication Data

US 2018/0111819 A1 Apr. 26, 2018

(51) Int. Cl.
*B67D 7/32* (2010.01)
*B67D 7/08* (2010.01)
*B67D 7/36* (2010.01)
*B67D 7/62* (2010.01)

(52) U.S. Cl.
CPC .......... *B67D 7/3209* (2013.01); *B67D 7/08* (2013.01); *B67D 7/36* (2013.01); *B67D 7/62* (2013.01)

(58) Field of Classification Search
CPC .......... B67D 7/3209; B67D 7/08; B67D 7/36; B67D 7/62
USPC ...................................................... 137/59, 60
See application file for complete search history.

(56) References Cited

U.S. PATENT DOCUMENTS

| 5,259,424 A * | 11/1993 | Miller et al. ............ F17C 5/007 137/80 |
| 6,913,046 B2 * | 7/2005 | Hutchinson et al. ........................ B67D 7/3209 137/68.15 |
| 8,376,185 B2 * | 2/2013 | Liebal et al. ............ B67D 7/08 137/1 |
| 2004/0129325 A1 * | 7/2004 | Bleeck et al. .......... F16K 17/04 138/30 |
| 2014/0261882 A1 * | 9/2014 | Lambrix et al. ......... B67D 7/04 141/94 |

FOREIGN PATENT DOCUMENTS

| EP | 1553270 A1 | 7/2005 |
| WO | WO 2018/081071 A3 * | 5/2018 ............. B60K 13/04 |

OTHER PUBLICATIONS

International Search Report and Written Opinion issued in International Application No. PCT/US17/58016, dated May 18, 2018, 16 pages.

* cited by examiner

*Primary Examiner* — Kevin L Lee
(74) *Attorney, Agent, or Firm* — Mintz Levin Cohn Ferris Glovsky and Popeo, P.C.

(57) ABSTRACT

Methods are devices are provided for preventing fracture of a fluid-filled chamber or tank. In general an anti-fracture expansion device can be disposed internally within a fluid-filled chamber such that during a freeze event displaced fluid can compress or flow into the anti-fracture expansion device, thereby reducing the likelihood that the chamber will rupture. The internal disposition of the expansion device prevents it from interfering with other components that may be connected to or adjacent to the fluid chamber, thereby conserving space. In certain embodiments, the expansion device can have a dual function wherein it can act as a flow control valve in addition to functioning as an anti-fracture expansion device.

7 Claims, 12 Drawing Sheets

ANTI-FRACTURE EXPANSION DEVICE

FIELD

The present disclosure relates generally to an internal dynamic freeze device for preventing cracking of a fluid-filled chamber.

BACKGROUND

Diesel Exhaust Fluid ("DEF") helps meet EPA 2010 NOx emissions standards. Most large diesel engine vehicles manufactured since 2010 utilize Selective Catalytic Reduction (SCR) requiring DEF injected into the exhaust stream to reduce NOx emissions in the engine's exhaust. Unlike diesel fuel, DEF freezes at approximately 12° Fahrenheit. When DEF freezes, it can expand up to 7%. When disposed within a container or tank, such as a flow meter, expansion of the DEF can result in significant damage.

Freeze plugs or expansion plugs are often used in the engine block of a car to prevent damage when water or coolant freezes. A freeze plug is a round plug that is pressed into a hole formed in the engine block and it is designed to "pop out" to allow for expansion of the water upon freezing. However, there are several problems with current freeze plugs: they can introduce additional leak points, and they often fail to "pop out." Additionally, traditional freeze plugs are not designed for use when the system is in operation. Therefore, once a freeze plug has "popped out," the system must receive maintenance before it can be placed back in service. For these reasons, it is not practical or reasonable to use a traditional freeze plug in a fuel dispenser.

Accordingly, there remains a need for improved methods and devices for preventing cracking of a fluid-filled chamber.

SUMMARY

Methods and devices are provided for preventing cracking of a fluid-filled chamber. In one embodiment, an anti-fracture expansion device is provided that includes a cap having external threads configured to mate with threads formed within a bore in a housing. A cuff is disposed within the cap and is freely rotatable relative to the cap. The device also includes a piston having a proximal end slidably disposed within the cuff and extending distally from the cuff. The piston is configured such that, when the cap is threadably mated to a bore in a sealed fluid-filled housing, the piston slides relative to the cuff and cap when a pressure within the fluid-filled housing increases to thereby expand a volume of the fluid-filled chamber.

The device can have any number of additional features and/or variations. For example, the proximal end of the piston can include a stabilizing sleeve that is slidably disposed within the cuff. The stabilizing sleeve and the cuff can define a chamber therebetween, such as a sealed chamber. An external surface of the stabilizing sleeve can be in a sealing engagement within an internal surface of the cuff.

As another example, the piston can include a sleeve having at least one opening formed therein for allowing fluid to flow therethrough. The sleeve can be slidably disposed around an elongate shaft having a distal end with at least one fluid inlet port, an inner lumen extending therethrough, and a proximal end with at least fluid outlet port that is aligned with the at least one opening formed in the sleeve such that fluid can flow through the elongate shaft and exit from the proximal end.

As yet another example, the device can include a bearing assembly disposed between the cuff and the cap for allowing rotation of the cuff relative to the cap. The device an also include a spring that biases the piston away from the cap. Furthermore, the device can include a fluid-filled housing having a bore formed therein and having threads formed within the bore that mate with the threads on the cap. The piston can be disposed within the housing when the cap is threadably disposed within the bore.

In another embodiment, a fuel dispenser is provided that includes a hydraulics cabinet having fuel dispensing components disposed therein, an electronics housing having electronics configured to process payment for fuel dispensed by the fuel dispensing components, and at least one dynamic anti-fracture device disposed internally within a fluid-filled chamber of the fuel dispenser. The dynamic anti-fracture device can be configured to allow a volume of the fluid-filled chamber to increase when a pressure of the fluid within the fluid-filled chamber exceeds a predetermined threshold pressure.

The fuel dispenser can have any number of additional variations or features. For example, the fluid-filled chamber can include a fluid inlet and a fluid outlet, and the dynamic anti-fracture device can be configured to control fluid flow through one of the fluid inlet and the fluid outlet. As another example, the dynamic anti-fracture device can maintain a check valve disposed within a fluid inlet of the fluid-filled chamber in an open position for allowing fluid to flow into the fluid-filled chamber. In other aspects, the dynamic anti-fracture device can include a compressible ball seated within an opening of the fluid-filled chamber. The ball can be configured to compress when the pressure of the fluid within the fluid-filled chamber exceeds the predetermined threshold pressure. Additionally, the ball can be configured to control a flow of fluid through the opening when the pressure of the fluid is less than the predetermined threshold pressure.

In other embodiments, the dynamic anti-fracture device can include a cap assembly having a piston slidably coupled thereto and disposed within the fluid-filled chamber. The piston can be configured to slide relative to the cap when the pressure of the fluid within the fluid-filled chamber exceeds the predetermined threshold pressure. Additionally, the piston can be slidably disposed on an elongate shaft. A filter can be disposed around the shaft for filtering fluid flowing through the fluid-filled chamber.

In another embodiment, a dynamic anti-fracture device and valve assembly is provided and includes a housing having an inlet, an outlet, and an inner chamber in fluid communication with the inlet and the outlet. An anti-fracture device is at least partially disposed within the inner chamber and is configured to control fluid flow through the inlet of the housing and to increase a volume of the inner chamber when a pressure within the inner chamber exceeds a predetermined threshold pressure.

The device can have any number of additional variations or features. As an example, the inlet can include a valve seat, and the anti-fracture device can include a spherical ball valve seated within the valve seat and be configured to control fluid flow therethrough. The spherical ball can be configured to compress when a pressure is applied thereto that exceeds the predetermined threshold pressure. As another example, the inlet can include a check valve, and the anti-fracture device can include a piston assembly having an elongate shaft that maintains the check valve in an open configuration when the anti-fracture device is at least partially disposed within the inner chamber.

BRIEF DESCRIPTION OF DRAWINGS

This invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various exemplary methods are devices are provided for preventing fracture of a fluid-filled chamber or tank. The devices are referred to as anti-fracture expansion devices. In general an anti-fracture expansion device can be disposed internally within a fluid-filled chamber such that during a freeze event displaced fluid can compress or flow into the anti-fracture expansion device, thereby reducing the likelihood that the chamber will rupture. The internal disposition of the expansion device prevents it from interfering with other components that may be connected to or adjacent to the fluid chamber, thereby conserving space. In certain embodiments, the expansion device can have a dual function wherein it can act as a flow control valve in addition to functioning as an anti-fracture expansion device.

Figure 1A:
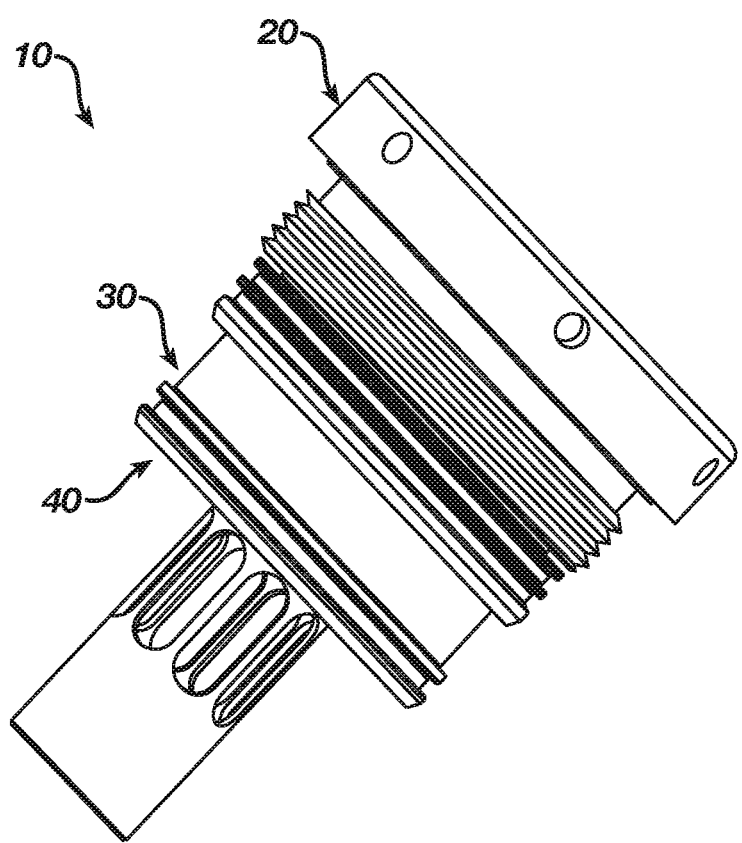
FIG. 1A is a side view of one embodiment of an anti-fracture expansion device.
Figure 1B:
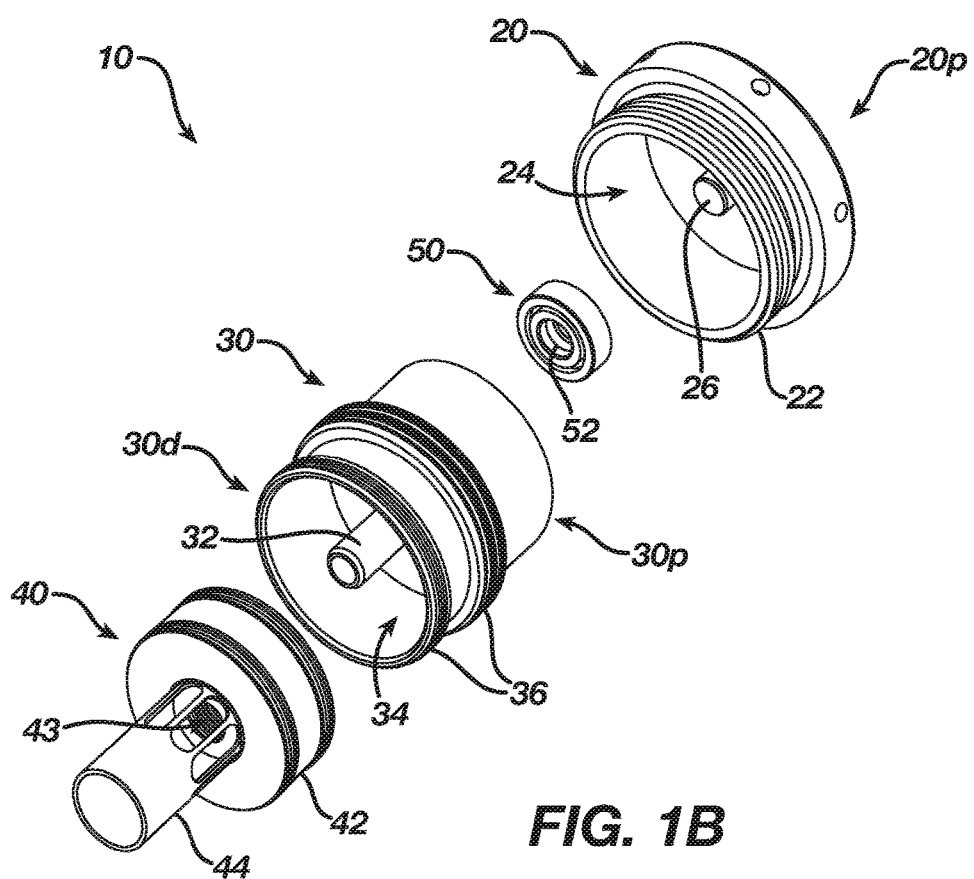
FIG. 1B is an exploded perspective view of the anti-fracture expansion device of FIG. 1A.
Figure 1C:
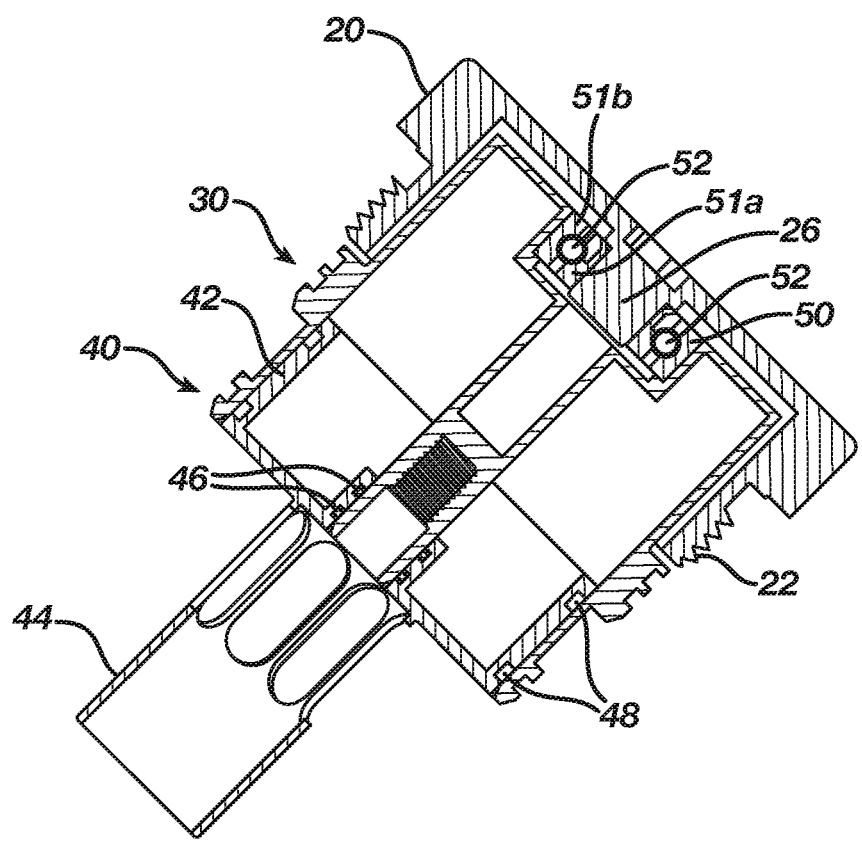
FIG. 1C is a side cross-sectional the anti-fracture expansion device of FIG. 1A.

FIGS. 1A-1C illustrate one embodiment of an anti-fracture expansion device 10 that includes a piston assembly 40 that is slidably disposed within a cylinder or cuff 30 so as to accommodate displaced fluid during a freeze event. The illustrated anti-fracture expansion device 10 can also include a cap 20 that is coupled to the cuff 30, and that includes threads 22 on an external surface thereof for threadably mating with threads formed in a bore of a fluid-filled housing. The illustrated piston assembly 40 includes a piston 42 and a centering sleeve 44 extending from the piston 42, however a person skilled in the art will appreciate that the sleeve 44 is optional and other centering techniques can be provided.

The cap 20 can have a variety of configurations, but in general is in the form of a hollow cylindrical housing with a sealed proximal end 20p. As noted above, the cap 20 includes external threads 22 for mating with a threaded bore in a fluid-filled housing, and a cavity 24 for receiving the cuff 30. An inner protrusion 26 is configured to mate, e.g., via friction, with an internal lumen 52 of a bearing 50 that is seated within the cavity 24 of the cuff 20. The bearing 50 allows the cap 20 to rotate independent of the cuff 30, while still fixing the cuff 30 to the cap 20.

The piston assembly 40 can have a variety of configurations, but in general has a cylindrical piston head 42 with a central opening 43 extending therethrough. The central opening 43 is configured to receive an inner shaft 32 of the cuff 30. Internal sealing elements 46 can be disposed therein to form a seal between the central opening 43 of the piston head 42 and the inner shaft 32 of the cuff 30. External sealing elements 48 can also be provided around the piston head 42 to form a seal between the outer-facing surface of the piston head 42 and the inside of the cuff 30. A sleeve 44 can extend distally from the piston head 42. The sleeve 44, if provided, can facilitate alignment of the piston assembly 40, as will be discussed in more detail below. In other embodiments, the cuff 30 may not have an inner shaft 32, and the piston head 42 may not have a central opening 43. In that event, the piston head 42 would need to be configured such that it would remain longitudinally aligned during sliding movement within the cuff 30.

As best shown in FIG. 1B, the cuff 30 is generally cylindrical and has a cylindrical cavity 34 formed therein for receiving the piston head 42. The cavity 34 is open at the distal end 30d and closed at the proximal end 30p. As shown in FIG. 1C, the proximal end 30p can include a recess or cavity 36 that is configured to receive the protrusion 26 formed within the cap 20. A bearing assembly 50 can be disposed therebetween for allowing free rotation of the cap 20 relative to the cuff 30. In an exemplary embodiment, the bearing assembly 50 is a radial ball bearing having inner and outer bearing races 51a, 51b with balls 52 therebetween such that the inner and outer bearing races 51a, 51b can rotate independently. The outer-facing surface of the outer bearing race 51b can form a friction fit within the cavity 34 at the proximal end 30p of the cuff 30. The inner-facing surface of the inner bearing race 51a can similarly form a friction fit with the protrusion 26 within the cap 20, thus mating the two components. The bearing assembly 50 thus allows the cap to be rotated to threadably mate with a housing without causing corresponding rotation of the cuff 30.

As shown in FIGS. 1B and 1C, the cuff 30 can also include an inner shaft 32 formed therein for slidably receiving the piston assembly 40 therearound, as will be discussed in more detail below. A number of external sealing rings 36, e.g., o-ring(s), can be disposed around the cuff 30 to form a seal between the cuff 30 and the fluid-filled housing. Additional sealing rings can be provided to form a seal between the cuff 30 and other components as may be needed.

A biasing element (not shown) can be disposed between the piston head 42 and the cuff 30, and it can be configured to bias the piston 40 away from the cuff 30 and into a distal position during normal operation. In certain embodiments, the biasing element can be a spring (or equivalent), or alternatively/additionally the assembled device may form a sealed air-tight volume between the piston head 42 and the cuff 30, in which case the air pressure within the assembly would act as a biasing element. If a spring (or equivalent) is used, then the piston head 42 and cuff 30 can form a pressurized volume, but they do not need to, e.g., the cuff could vent to atmosphere. The pressure exerted on the piston head 42 by the biasing element may be varied or selected based on fluid pressure variances which may occur during normal operating conditions. Regardless of the configuration of the biasing element, it should apply a force to the piston head 42 that is sufficient to prevent movement of the piston 40 during normal operating conditions, but that allows movement of the piston 40, and thus expansion of the chamber volume, during a freeze event. In certain exemplary embodiments, the biasing element provides a pressure in the range of 200 to 300 psi.

When fully assembled, the piston 40 and cuff 30 are fully inserted into a fluid filled housing, and the threaded cap 20 is threaded into a bore in the housing to seal the housing. During normal operation, the piston 40 will remain in a distal position within the cuff 30, as shown in FIG. 1C, either due to the spring-bias or the pressure within the cuff. The force that maintains the piston 40 in the distal position can be designed to be greater than the normal operating pressure of the fluid within the fluid-filled housing to accommodate possible pressure fluctuations.

During a freeze event, fluid within the housing will increase the pressure within the chamber. As the pressure increases and eventually exceeds the force that maintains the piston in the distal position, it will force the piston 40 to move proximally into the cuff 30, thereby expanding the chamber volume and relieving pressure within the housing, thus preventing cracking or other damage to the housing. When the fluid begins to thaw, the fluid pressure on the piston 40 will decrease, and the biasing element can move the piston 40 in the distal direction back to its initial position.

Figure 2A:
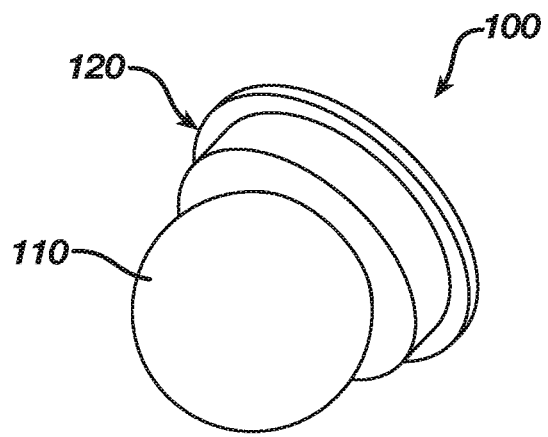
FIG. 2A is a side perspective view of another embodiment of an anti-fracture expansion device.
Figure 2B:
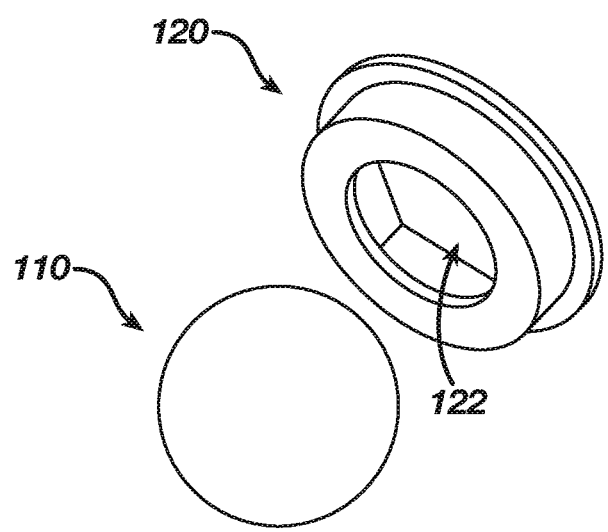
FIG. 2B is an exploded view of the anti-fracture expansion device of FIG. 2A.

FIGS. 2A and 2B depict another embodiment of an anti-fracture expansion device 100. In this embodiment, the device 100 includes a compressible body 110 and a seating element 120 having an opening 122 that seats the body 110. As shown, the compressible body 110 has a generally spherical configuration such that it is configured to sit within a circular opening 122 in the seating element 120. One skilled in the art will appreciate that the geometry of the compressible body 110 is not limited to a sphere as illustrated, and any number of geometries that suit the flow/storage system, and that allow for compression, can be used.

The compressible body 110 can be any shape, e.g. spherical, donut, etc., and can be formed from any material that is suitable for the desired geometry and that allows for compression under the desired conditions. For example, the body 110 can be configured as a hollow rubber shell filled with a gas, or it can be made from closed-cell foam or any other similar material. For long-term use, the compressible body 110 should be formed from an elastic material. It is envisioned that there may be conditions where a single use or short-term use compressible body may be suitable, in which case a compressible inelastic body can be used.

In certain circumstances, the compressible body 110 can be coated to prevent corrosion and wear. If the compressible body 110 is made from a material that will release a gas during compression, the coating can serve to prevent gas from being released, though it is expected that any gas that might be released would be minimal.

The internal pressure and/or the composition of the compressible body 110 can be selected based on fluid pressure ranges which may occur during normal operating conditions. During normal operation, the compressible body 110 will compress very little. During a freeze event, pressure within the chamber will increase as the fluid freezes. As the pressure increases, the compressible body 110 will compress thereby expanding the chamber volume and relieving pressure within the housing. When the frozen fluid begins to thaw, the fluid pressure on the compressible body 110 will decrease, and the compressible body 110 will back to its initial configuration.

The seating element 120 can function to secure the compressible body 110 in the desired position within the chamber. In the illustrated embodiment, the seating element 120 is in the form of a ring-shaped member having a circular opening 122 formed therein and configured to seat the compressible body 110. The geometry, design, materials, etc. used for the seating element 120 can be based on factors associated with chamber environment. For example, the seating element 120 can be designed to limit motion of the compressible body 110 to a given specification, and it should be made out of a material that can withstand the fluid-filled chamber environment. The seating element 120 can also be a biasing element, as will be described below. As will be appreciated by a person skilled in the art, the seating element 120 can be an independent and removable component, or it can be an integral part of the chamber.

Figure 3A:
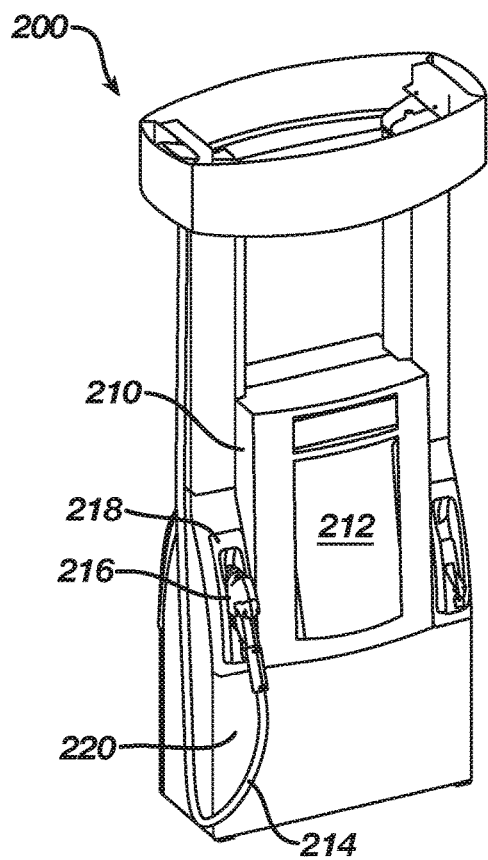
FIG. 3A is a front perspective view of one embodiment of a fuel dispenser.
Figure 3B:
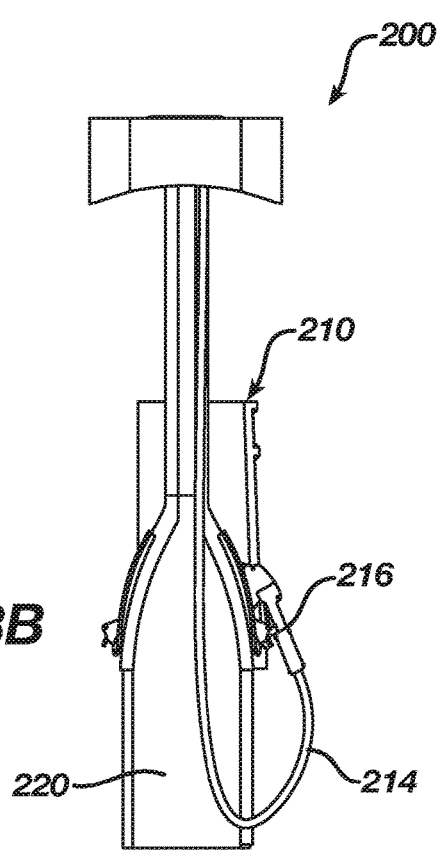
FIG. 3B is a side view of the fuel dispenser of FIG. 3A.

While the anti-fracture expansion devices disclosed herein can be used in numerous applications, including automotives, home and industrial heating and cooling systems, etc., in an exemplary embodiment, the devices are used in a fuel dispenser. FIGS. 3A and 3B illustrate one embodiment of a fuel dispenser 200. The fuel dispenser 200 generally includes an electronics compartment 210 and a pump compartment 220. The electronics compartment 210 houses electronics for facilitating payment for fuel and for facilitating the dispensing of the fuel. The electronics include, for example, a fuel controller configured to control dispensing of the fuel from the pump compartment, a communication unit configured to transmit and receive wired and/or wireless communications, a display 212 configured to show information (e.g., media content, payment information, etc.) thereon, a memory configured to store data therein, and a payment terminal (e.g., a card reader, etc.)

configured to process customer payment. Only the display 212 is shown in FIGS. 3A and 3B. Similar components can be located on the other side of the electronics compartment 210.

The pump compartment 220 houses a pump configured to pump fuel from a fuel tank or other reservoir and has therein a fuel meter configured to monitor fuel flow. The pump compartment 220 can include other components to facilitate fuel dispensing, such as valves, a strainer/filtering system, a vapor recovery system, etc. The pump compartment 220 is isolated from the electronics compartment 210 within the fuel dispenser 200 to facilitate safety, security, and/or maintenance, as will be appreciated by a person skilled in the art. Fuel is thus not allowed to flow from the pump compartment 220 to the electronics compartment 220.

The fuel dispenser 200 is configured to be connected to the fuel tank or other reservoir containing fuel. When filling up the tank of a motor vehicle, the fuel is pumped from the tank or reservoir by the pump located in the pump compartment 220 and ultimately to a nozzle 216 via a fuel pipe (not shown) and a fuel hose 214. When each fuel hose 214 is not in use, the fuel hose 214 hangs along the fuel dispenser 200, and its associated nozzle 216 is seated in a nozzle boot 218. The illustrated fuel dispenser 200 is configured to have two hoses 214 and two nozzles 216 on one side of the dispenser 200 and two hoses 214 and two nozzles 216 on the other side of the dispenser 200, but as will be appreciated by a person skilled in the art, the fuel dispenser 200 can include any number of hoses and nozzles. A person skilled in the art will also appreciate that the fuel dispenser can have various other configurations.

Figure 4A:
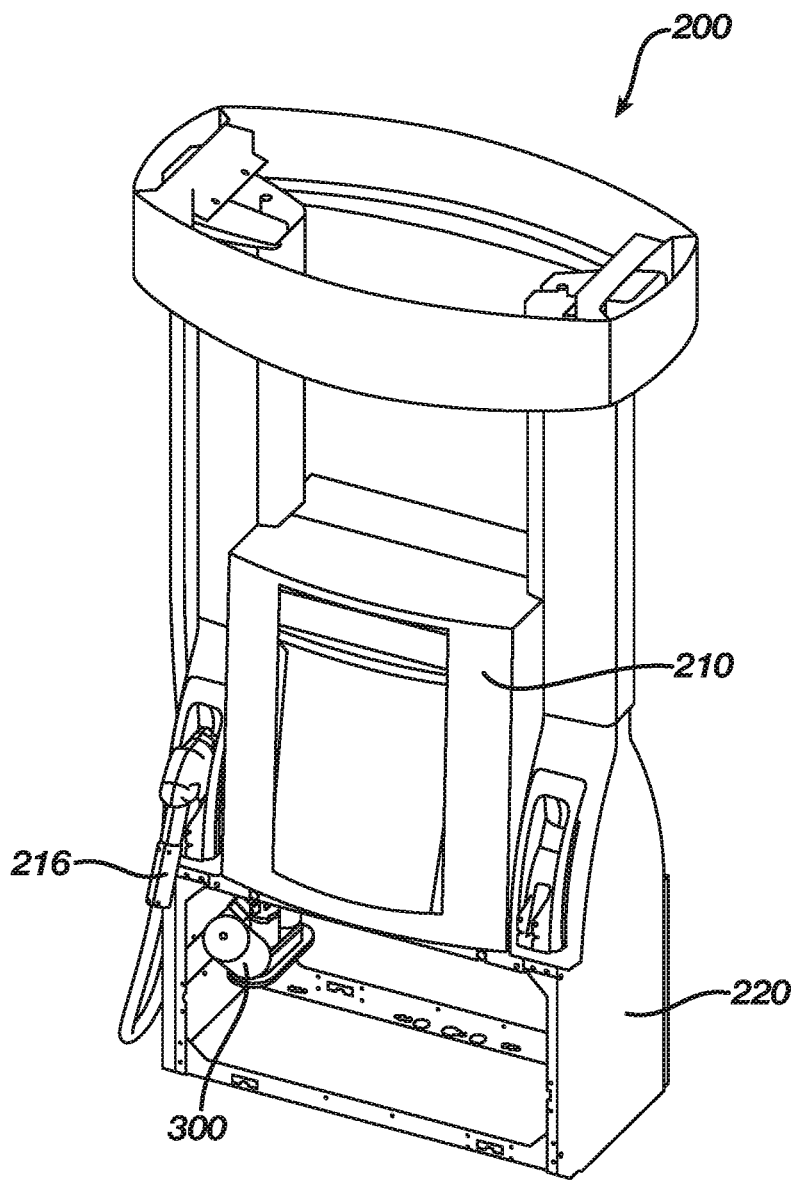
FIG. 4A is a front perspective view of the fuel dispenser of FIG. 3A with an open hydraulics cabinet.
Figure 4B:
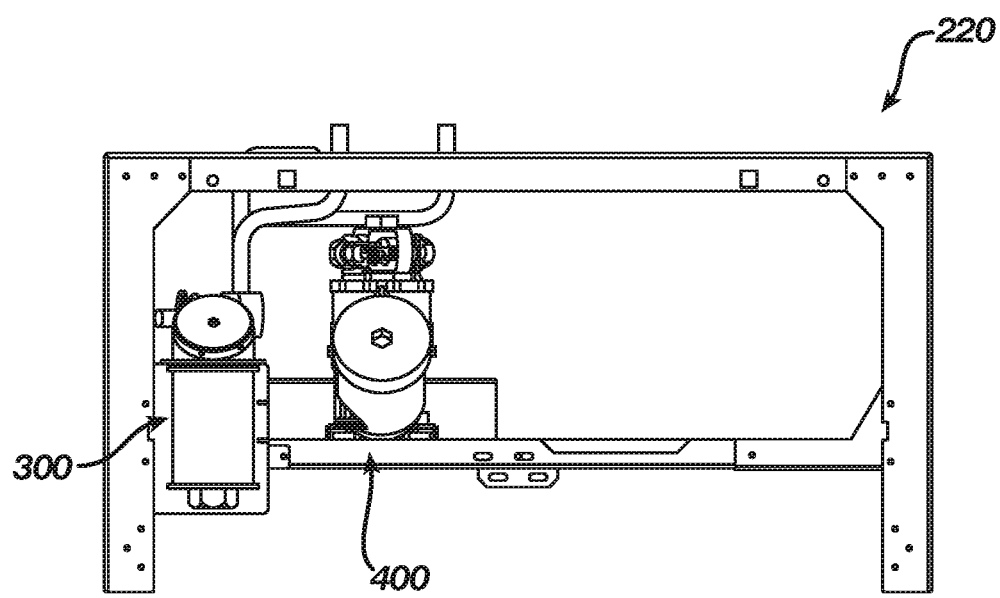
FIG. 4B is a front view of a portion of the hydraulics cabinet of FIG. 4A showing two different embodiments of filtering/metering systems where anti-fracture expansion devices can be located.

The anti-fracture expansion devices disclosed herein can be employed in a number of different locations within a fuel dispenser. FIG. 4A illustrates the fuel dispenser 200 of FIGS. 3A and 3B, showing some of the internal components of the pump compartment 220. In one embodiment, an expansion device can be located in a meter assembly. FIG. 4A illustrates one embodiment of a metering assembly 300 disposed within the pump compartment, and FIG. 4B illustrates the metering assembly 300 of FIG. 4A, as well as an additional embodiment of a metering assembly 400. In another embodiment, as further shown in FIG. 4A, an expansion device can be disposed within a nozzle 216 of the fuel dispenser 200. A person skilled in the art will appreciate that the anti-fracture expansion devices disclosed herein can be incorporated into any meter assembly known in the art, or into any fluid-filled location within a fuel dispenser that is susceptible to damage due to a freeze event.

Figure 5A:
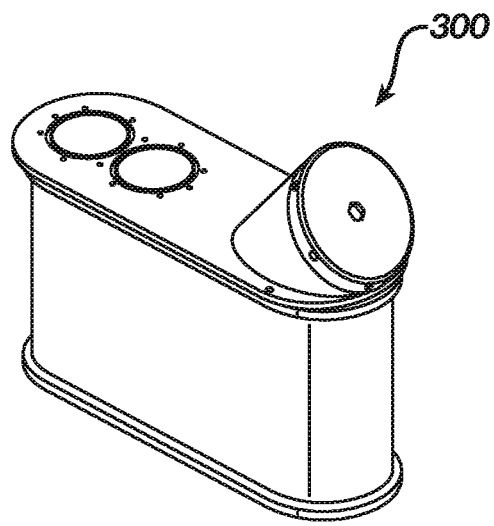
FIG. 5A is a perspective view of the leftmost filtering and metering system of FIG. 4B.
Figure 5B:
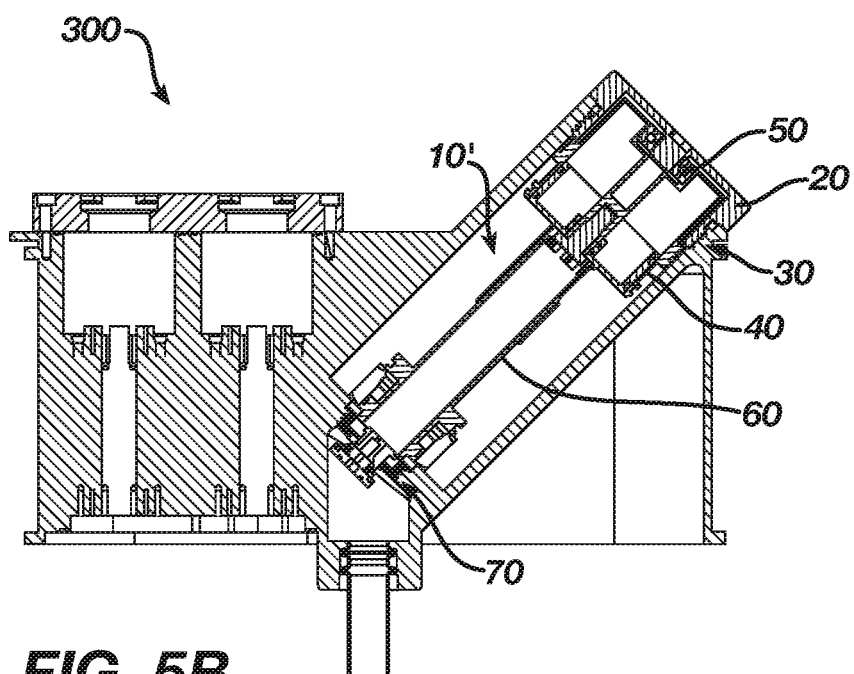
FIG. 5B is a side cross-sectional view of the filtering and metering system of FIG. 5A.
Figure 5C:
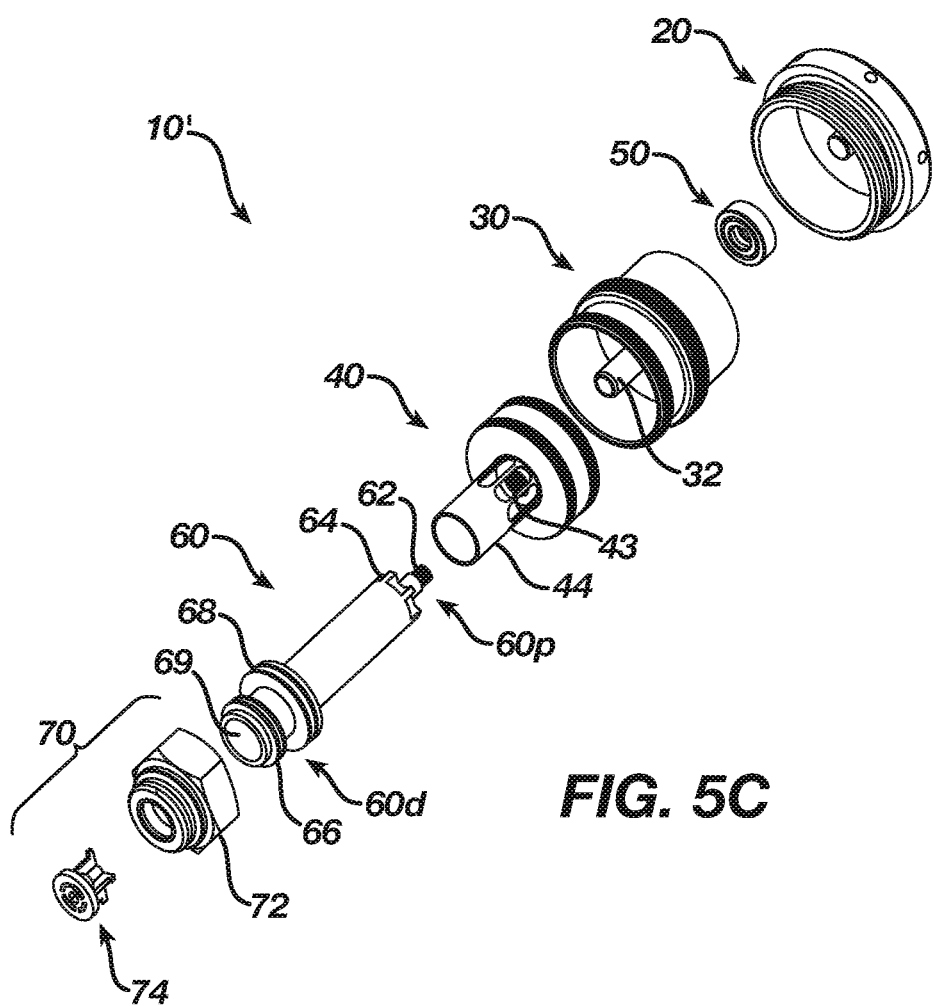
FIG. 5C is an exploded view of an anti-fracture expansion device of the filtering and metering system of FIG. 5A.

FIGS. 5A-5C illustrate an embodiment of an anti-fracture expansion device employed in a filtering and metering assembly 300 shown in FIG. 4B. The expansion device is identical to the device 10 discussed above with respect to FIGS. 1A-1C, however in this embodiment the device 10' includes a fluid delivery shaft 60 and a valve assembly 70 located at the distal end of the shaft.

As best shown in FIG. 5C, the fluid delivery shaft 60 is in the form of an elongate hollow shaft having a proximal end 60p with a threaded protrusion 62 extending proximally therefrom for mating with threads formed within the inner shaft 32 of the cuff 30, which is disposed within the central opening 43 of the piston head 42, thereby fixing the position of the fluid delivery shaft 60 relative to the cuff 30. The proximal end 60p can also include several fluid outlets 64 formed therein and spaced around a perimeter thereof for allowing fluid to exit the shaft 60 and to flow into the surrounding chamber. The fluid outlets 64 align with the cutouts in the sleeve 44, though they need not be aligned to permit fluid flow.

The distal end of the fluid delivery shaft 60 can be configured to couple to the valve assembly, and as shown in FIG. 5C the distal end 60d includes a head 66 formed thereon that is received within a nut 72 of the valve assembly 70. The head 66 functions as a sealing ring to form a seal with the nut 72. The head 66 can also function to open a valve by pushing against it, which will be discussed below. An opening 69 is formed in the head 66 for allowing fluid flow into the inner lumen of the fluid delivery shaft 60. A stop flange 68 can be located just proximal of the head 66 for functioning as a stop to control an insertion depth of the head 66 into the nut 72.

The valve assembly has a nut 72, as mentioned above, that is threaded on the distal portion for threadably mating with a threaded bore in a wall of the fluid-filled housing, i.e., the filter/strainer housing of the meter assembly. A valve seal 74 is received within a distal end of the lock nut 72 and is biased proximally toward the closed position.

In use, the valve assembly is installed into the chamber of a fluid-filled housing via threading or some other means of securing the assembly into the chamber. As the anti-expansion device 10' is attached to the fluid-filled chamber, the head 66 on the fluid delivery shaft 60 is inserted into the lock nut 72 such that the sealing rings on the fluid delivery shaft form a seal with the internal wall of the lock nut. As the cap 20 is threaded into the chamber, the device moves distally until the cap is secure. The stop flange 68 on the fluid delivery shaft 60 will abut the lock nut 72. In this position, the head 66 will push the valve seal 74 distally, thereby moving the valve seal 74 from the closed position to an open position. Fluid can thus flow past the valve seal 74 and into the fluid delivery shaft 60, which guides the fluid into the chamber in a controlled manner. If the cap is removed, the pressure on the valve seal is released, and the seal will close. This serves as a safety mechanism to prevent unwanted outflow during maintenance operations.

A person skilled in the art will appreciate that the valve assembly need not include a lock-nut, specifically. There are any number of variations that could be used to secure the valve seal within the chamber, e.g., the valve could be connected to a plate that is welded or champed to the chamber.

During normal operation, fluid enters through the chamber inlet and the valve opening, flows into the distal opening of the fluid delivery shaft 60, traverses the length of the shaft 60, and exits through the fluid outlets 64 in the shaft and the cutouts in the sleeve 44. The elongate cut-outs in the sleeve 43 align with the fluid outlets 64 in the fluid delivery shaft 60 to allow fluid to pass therethrough, regardless of the position of the piston assembly 40. At that point, the fluid may be filtered, treated, stored, etc., as desired. For example, a filter or strainer can be disposed within the chamber around the fluid delivery shaft 60 for filtering the fluid as it flows therethrough. Once treatment has been completed, the fluid may be released through an outlet to be passed through a metering system.

During a freeze event, fluid within the housing will increase the pressure within the chamber. As the pressure increases and eventually exceeds the force that maintains the piston in the distal position, it will force the piston to move proximally into the cuff, thereby expanding the chamber volume and relieving pressure within the housing. When the frozen fluid begins to thaw, the fluid pressure on the piston will decrease, and the biasing element can move the piston distally back to its initial position.

Figure 6A:
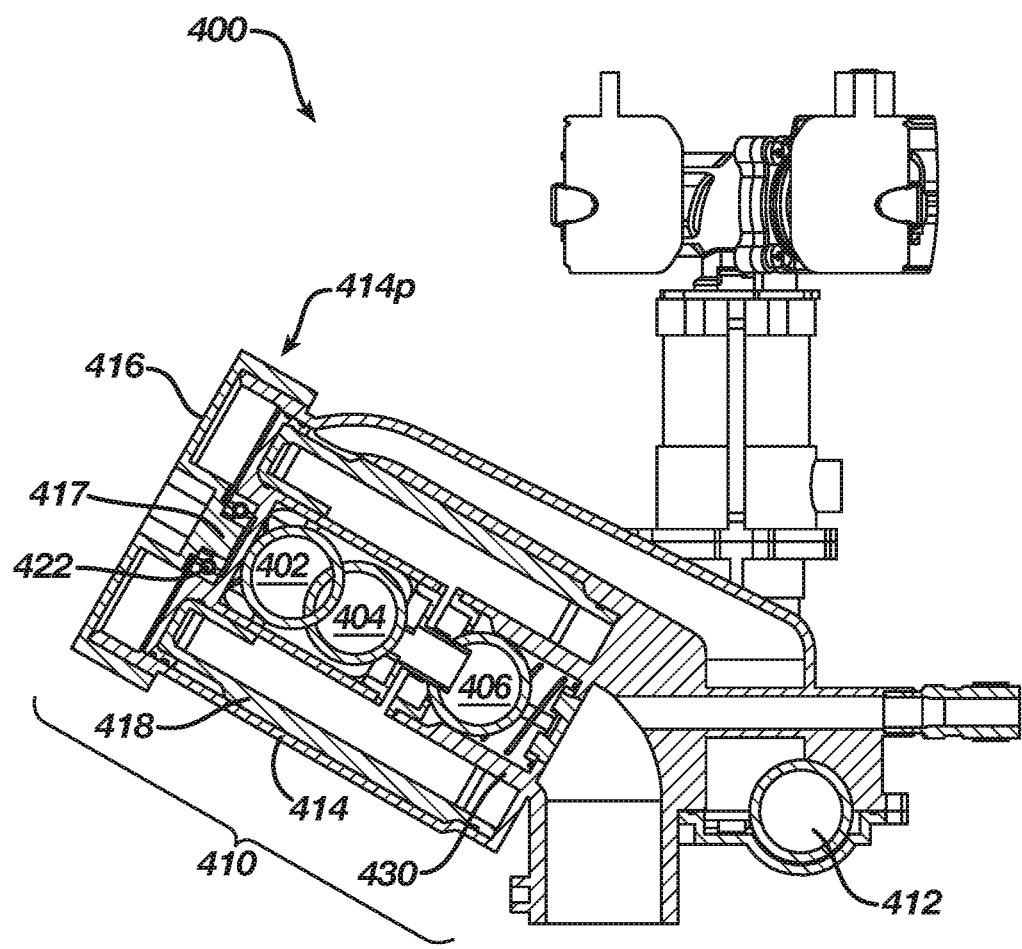
FIG. 6A is a side cross-sectional view of the rightmost filtering and metering system of FIG. 4B.
Figure 6B:
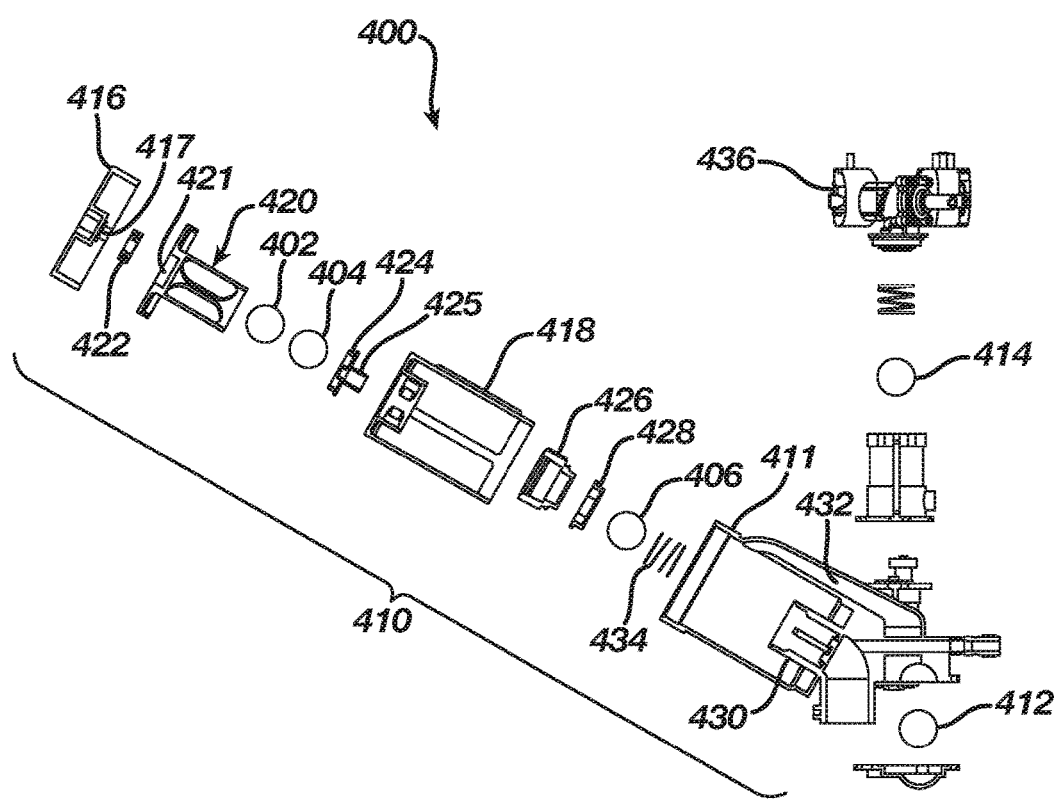
FIG. 6B is an exploded side cross-sectional view of the filtering and metering system of FIG. 6A.

FIGS. 6A-6B illustrate meter assembly 400 of FIG. 4B having the compressible ball variant of an anti-fracture expansion device employed therein. In this embodiment, the metering assembly 400 has a filter chamber 410 that includes three anti-fracture expansion devices 402, 404, 406 disposed therein. The first and second expansion devices 402 and 404 function solely as expansion devices to relieve pressure within the chamber 410. The third expansion device 406 functions to relieve pressure within the chamber 410 and also functions as a valve to control fluid flow through the chamber 410. The third expansion device 406 is disposed within a distal portion of the fluid-filled chamber 410, whereas the first and second expansion devices 402, 404 are disposed within a proximal portion of the fluid-filled chamber 410. The valve containing the second expansion device 404 controls fluid flow between the proximal and distal portions of the chamber 410. FIGS. 6A and 6B also illustrate two additional expansion devices 412, 414 disposed within other portions of the meter assembly 400, as may be desired. Each of the illustrated expansion devices has a configuration as previously discussed with respect to FIGS. 2A-2B, and the valve seat is included in the devices that function as a valve.

With reference to the first, second, and third expansion devices 402, 404, 406, the illustrated filter chamber 410 includes an outer housing 414 that can be separate from or integrally formed as part of the metering assembly 400 as shown, and a cap 416 that is configured to mate to a proximal open end 414p of the outer housing 414. The cap 416 can have a variety of configurations, but in general is in the form of a hollow cylindrical housing with a sealed proximal end. The cap 416 includes internal threads (not shown) for mating with external threads on the outer housing 411. A cage 418 is disposed within the outer housing 414 and is configured to seat a filter or strainer therein. The filter chamber 410 also includes a sleeve 420 that is received within the cage 418 and that retains the anti-fracture expansion devices 402 and 404. The sleeve 420 has a proximal end with an opening 421 formed therein that seats the bearing assembly 422, which in turn is disposed around a pin 417 formed within the cap 416 to allow free rotation of the cap 416 relative to the sleeve as well as the outer housing 411.

The first and second compressible anti-fracture expansion devices 402, 404 are disposed within the sleeve 420, with the second device 404 being distal of the first device 402 and resting on a valve seat 424 that retains the devices 402, 404 within the sleeve 420. When the second device 404 is seated in the valve seat 424, the valve seat 424 will be in a closed configuration to prevent fluid flow therethrough. However, the second device 406 can be configured to move proximally in response to fluid pressure during normal operating to allow fluid flow through the valve seat 424. The valve seat 424 also includes a pin 425, which will be discussed below. The distal end of the sleeve 420 has an opening formed therein that receives the valve seat 424. The valve seat 424 in turn is mated to a cylindrical housing 426 having a fluid pathway extending therethrough. The cylindrical housing 426 mates to an inlet channel 430 formed within a distal end of the outer housing 411, and a second valve seat 428 is disposed between the cylindrical housing 426 and the inlet channel 430 to control fluid flow from the inlet channel into the filter chamber 410. The distal end of the cylindrical housing 426 can have external sealing elements to form a fluid-tight seal with the internal surface of the valve seat 428.

The third compressible anti-fracture expansion device 406 is disposed distal of the second valve seat 428 for controlling fluid flow through the second valve seat 428. A biasing element, such as a spring 434, can be positioned distal of the second device 406 for biasing the second device 406 into the valve seat 428, and thus into a closed position. When the cap 416, sleeve 420, and cage 418, along with the components disposed therein, are inserted into the outer housing 411, the pin 425 on the first valve seat 424 will extend through the cylindrical housing 426 and will contact the third device 406. As the cap 416 is threaded onto the outer housing 411, the assembly moves distally and the pin 425 will apply pressure the third compressible device 406. When the cap 416 is secured to the outer housing 411, the pin 425 moves the third device 406 away from the valve seat 428 thereby maintaining it in an open position. When the cap 416 and assembly coupled thereto is removed, the pin 425 no longer applies pressure to the third device 406, allowing it to form a seal with the valve seat 428 to thereby prevent fluid from entering the chamber 410. This serves as a safety mechanism to prevent unwanted outflow during maintenance operations.

In use, fluid can flow into the filter chamber 410 from the fluid inlet 430, through the second valve seat 428, through the cylindrical housing 426, and through the first valve seat 424 where it is released into the chamber 410 to be filtered, strained, or other treated. As shown in FIGS. 6A and 6B, the fluid can pass through a fluid exit 432 formed in a sidewall of the filter chamber 410 to be delivered to the meter. During this process, the valves will remain open, and the anti-fracture devices 402, 404, 406 will compress very little. In the illustrated embodiment, the fourth and fifth compressible members 412, 414 are disposed along the fluid flow path between the filter chamber 410 and the meter 436.

During a freeze event, pressure within the chamber will increase as the fluid freezes. As the pressure increases, the devices 402, 404, 406 will compress thereby expanding the chamber volume and relieving pressure within the housing. When the frozen fluid begins to thaw, the fluid pressure on the devices 402, 404, 406 will decrease, and the devices 402, 404, 406 can return back to their initial configuration. This same compression can occur during a freeze event with respect to the fourth and fifth compressible members 412, 414.

Figure 7:
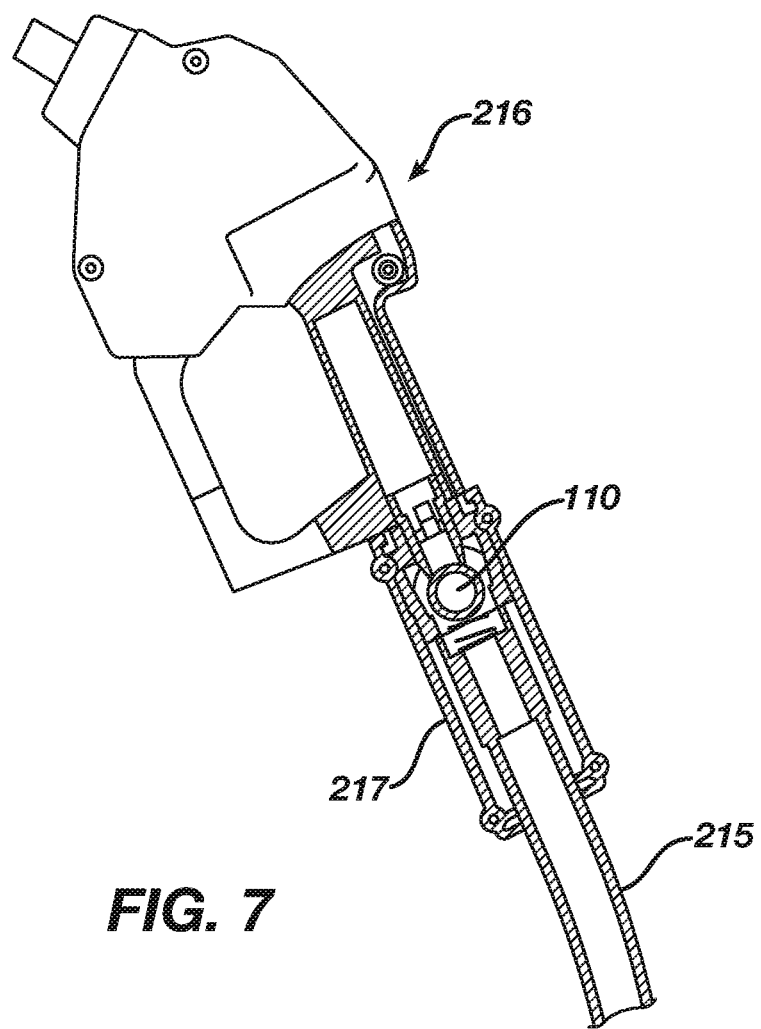
FIG. 7. is a side cross-sectional view of the nozzle of FIG. 4A having the anti-fracture expansion device therein.

FIG. 7 illustrates the nozzle 216 of FIG. 4A having the anti-fracture expansion device 100 of FIGS. 2A-2B disposed therein. In general, the nozzle 216 is coupled to the distal end of the hose 215 which has a fluid channel formed therein for delivering fluid to the nozzle 216. A connector 217 is disposed around the distal end of the hose 215 and is configured to couple the hose 215 to the nozzle 216 in a fluid-tight manner so as to prevent fluid from leaking therefrom. As shown in FIG. 7, the compressible member 110 of the anti-fracture expansion device 100 of FIGS. 2A-2B is disposed within the fluid pathway of the connector 217. In use, fluid flows from the hose 215, through the connector 217 and into the nozzle 216. In a freeze event when fluid in the connector 217 freezes and expands the pressure within the chamber in the connector 217, the compressible member 110 can compress to expand the volume within the chamber and thereby preventing any damage to the connector 217.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A fuel dispenser, comprising
a hydraulics cabinet having fuel dispensing components disposed therein;
an electronics housing having electronics configured to process payment for fuel dispensed by the fuel dispensing components; and
at least one dynamic anti-fracture device disposed internally within a fluid-filled chamber of the fuel dispenser, the dynamic anti-fracture device being configured to allow a volume of the fluid-filled chamber to increase when a pressure of the fluid within the fluid-filled chamber exceeds a predetermined threshold pressure.

2. The fuel dispenser of claim 1, wherein the fluid-filled chamber includes a fluid inlet and a fluid outlet, and wherein the dynamic anti-fracture device is configured to control fluid flow through one of the fluid inlet and the fluid outlet.

3. The fuel dispenser of claim 1, wherein the dynamic anti-fracture device maintains a check valve disposed within a fluid inlet of the fluid-filled chamber in an open position for allowing fluid to flow into the fluid-filled chamber.

4. The fuel dispenser of claim 1, wherein the dynamic anti-fracture device comprises a compressible ball seated within an opening of the fluid-filled chamber, the ball being configured to compress when the pressure of the fluid within the fluid-filled chamber exceeds the predetermined threshold pressure.

5. The fuel dispenser of claim 1, wherein the ball is configured to control a flow of fluid through the opening when the pressure of the fluid is less than the predetermined threshold pressure.

6. The fuel dispenser of claim 1, wherein the dynamic anti-fracture device comprises a cap assembly having a piston slidably coupled thereto and disposed within the fluid-filled chamber, the piston being configured to slide relative to the cap assembly when the pressure of the fluid within the fluid-filled chamber exceeds the predetermined threshold pressure.

7. The fuel dispenser of claim 6, wherein the piston is slidably disposed on an elongate shaft having a filter disposed therearound for filtering fluid flowing through the fluid-filled chamber.

* * * * *